United States Patent
Tomita et al.

(10) Patent No.: US 11,376,948 B2
(45) Date of Patent: Jul. 5, 2022

(54) VEHICLE

(71) Applicant: HONDA MOTOR CO., LTD., Tokyo (JP)

(72) Inventors: Jin Tomita, Saitama (JP); Naoto Kochi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 529 days.

(21) Appl. No.: 16/568,828

(22) Filed: Sep. 12, 2019

(65) Prior Publication Data
US 2020/0086736 A1 Mar. 19, 2020

(30) Foreign Application Priority Data
Sep. 19, 2018 (JP) .............................. JP2018-175135

(51) Int. Cl.
*B62D 25/08* (2006.01)
*B60K 15/01* (2006.01)
(Continued)

(52) U.S. Cl.
CPC ............ *B60K 15/013* (2013.01); *B60R 13/00* (2013.01); *B62D 25/082* (2013.01);
(Continued)

(58) Field of Classification Search
CPC ..... B60R 2011/0005; B60R 2011/0038; B60R 16/0215; B60R 13/00; B62D 25/08;
(Continued)

(56) References Cited

U.S. PATENT DOCUMENTS

2011/0132638 A1* 6/2011 Oga ..................... B60R 16/0215
174/135
2013/0264113 A1* 10/2013 Takata ................ B60R 16/0215
174/72 A
(Continued)

FOREIGN PATENT DOCUMENTS

EP 2806515 A2 11/2014
JP H07-298447 A 11/1995
(Continued)

OTHER PUBLICATIONS

Mar. 17, 2020, Japanese Office Action issued for related JP Application No. 2018-175135.

*Primary Examiner* — Gregory A Blankenship
(74) *Attorney, Agent, or Firm* — Paratus Law Group, PLLC

(57) ABSTRACT

A vehicle includes a vehicle interior, a front room provided in front of the vehicle interior with a dashboard interposed therebetween, a first protection target that is disposed along the dashboard and extends in an upper-lower direction, and a first protector that has a concave sectional shape and covers the first protection target toward the dashboard. The first protection target includes a curved portion curved along a curvature of the dashboard, and the first protector includes a bent portion that covers the curved portion, an upper extension portion that extends upward from the bent portion, and a lower extension portion that extends downward from the bent portion. The upper extension portion includes a first fixing portion that has a bolt insertion hole and is fixed to the dashboard, and the lower extension portion includes a second fixing portion that has a slit opened downward and is fixed to the dashboard.

9 Claims, 10 Drawing Sheets

(51) Int. Cl.
  *B60R 13/00* (2006.01)
  *B60R 11/00* (2006.01)
  *H02G 3/04* (2006.01)

(52) U.S. Cl.
  CPC ......... *B62D 25/084* (2013.01); *B62D 25/085* (2013.01); *B60R 2011/0005* (2013.01); *B60R 2011/0038* (2013.01); *H02G 3/0487* (2013.01)

(58) Field of Classification Search
  CPC ...... B62D 25/082; B62D 25/14; B60K 37/00; B60K 37/04; B60K 35/00; B60K 2370/44; B60K 2370/682; B60K 2370/80; B60K 2370/84; B60K 15/013; H02G 3/0487
  See application file for complete search history.

(56) References Cited

U.S. PATENT DOCUMENTS

| | | |
|---|---|---|
| 2015/0101696 A1 | 4/2015 | Ishiki et al. |
| 2017/0358911 A1 | 12/2017 | Nagashima et al. |
| 2019/0009733 A1* | 1/2019 | Hawkins .................. B60R 11/00 |
| 2019/0061651 A1* | 2/2019 | Takahashi ........... B60R 16/0215 |
| 2019/0126862 A1* | 5/2019 | Sasaki .................. H01B 7/0045 |
| 2019/0232776 A1* | 8/2019 | Matsuda ................ B60K 15/03 |
| 2019/0232895 A1* | 8/2019 | Yamada ............. B60R 16/0215 |
| 2020/0086736 A1* | 3/2020 | Tomita ................ B60R 13/0838 |
| 2020/0198558 A1* | 6/2020 | Adachi ............... B60R 16/0215 |
| 2021/0036107 A1* | 2/2021 | Okamoto ........... H01L 29/0649 |
| 2021/0053623 A1* | 2/2021 | Shimokouchi ........... B60K 1/00 |
| 2021/0277824 A1* | 9/2021 | Nakagawa .............. B60T 17/04 |

FOREIGN PATENT DOCUMENTS

| | | |
|---|---|---|
| JP | 2004-201393 A | 7/2004 |
| JP | 2009-124924 A | 4/2009 |
| JP | 2010-173568 A | 8/2010 |
| JP | 2011-079471 A | 4/2011 |
| JP | 2012-197034 A | 10/2012 |
| JP | 2012-228055 A | 11/2012 |
| JP | 2015-078605 A | 4/2015 |
| JP | 2015-154570 A | 8/2015 |
| JP | 2016-019343 A | 2/2016 |
| JP | 2016-189683 A | 11/2016 |
| JP | 2017-224435 A | 12/2017 |

\* cited by examiner

VEHICLE

CROSS-REFERENCE TO RELATED APPLICATIONS

This application is based on and claims priority under 35 USC 119 from Japanese Patent Application No. 2018-175135 filed on Sep. 19, 2018.

TECHNICAL FIELD

The present invention relates to a vehicle in which a protection target such as a cable or a pipe is disposed along a dashboard.

BACKGROUND ART

In the vehicle of JP-A-2015-78605, the vehicle includes a fuel pipe which extends in a left-right direction at a position closer to a vehicle interior than an internal combustion engine, and a protection member that protects the fuel pipe. The protection member is attached to a dashboard that defines an engine compartment in front of the vehicle interior and covers the fuel pipe from the internal combustion engine.

When the internal combustion engine moves relatively toward the vehicle interior during a vehicle collision, according to JP-A-2015-78605, the protection member is plastically deformed and the fuel pipe extending in the left-right direction is displaced upward, so that the fuel pipe can be prevented from being caught by the internal combustion engine.

However, when a cable, a pipe or the like extends in an upper-lower direction along the dashboard, the technique described in JP-A-2015-78605 cannot be used directly, leaving room for improvement.

SUMMARY

An aspect of the present invention provides a vehicle in which a protection target extending in an upper-lower direction along a dashboard can be properly protected during a vehicle collision.

An embodiment of the present invention relates to a vehicle which includes:
 a vehicle interior;
 a front room provided in front of the vehicle interior with a dashboard interposed therebetween;
 a first protection target that is disposed along the dashboard and extends in an upper-lower direction; and
 a first protector that has a concave sectional shape and covers the first protection target toward the dashboard,
  wherein the first protection target includes a curved portion curved along a curvature of the dashboard, and
  wherein the first protector includes:
   a bent portion that covers the curved portion:
   an upper extension portion that extends upward from the bent portion; and
   a lower extension portion that extends downward from the bent portion,
  wherein the upper extension portion includes a first fixing portion that has a bolt insertion hole and is fixed to the dashboard, and
  wherein the lower extension portion includes a second fixing portion that has a slit opened downward and is fixed to the dashboard According to the above embodiment of the present invention, during the vehicle collision, the first protector is restricted from detachment by the first fixing portion and is displaced or separated from the bolt in the slit of the second fixing portion. Accordingly, stress acting on the first protector can be relieved. Accordingly, the first protector can be restricted from being detached from the dashboard and prevented from breakage. Therefore, the first protection target extending in the upper-lower direction along the dashboard can be properly protected.

DESCRIPTION OF EMBODIMENTS

Figure 1:
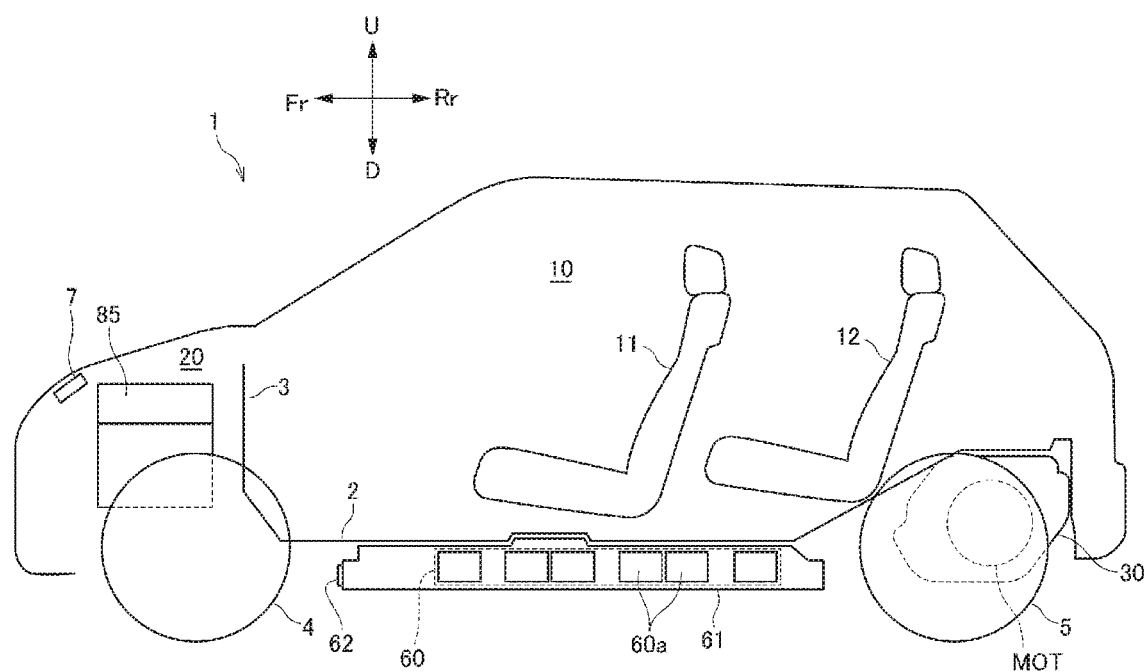
FIG. 1 is a schematic side view showing an overall structure of a vehicle according to an embodiment of the present invention.

A vehicle according to an embodiment of the present invention will be described below with reference to drawings. The drawings are viewed in directions of reference numerals. In the following description, front, rear, left, right, upper, and lower directions are described according to a view from an operator. In the drawings, front, rear, left, right, upper, and lower directions of the vehicle are denoted by Fr, Rr, L, R, U, D, respectively.

[Overall Structure of Vehicle]

Figure 2:
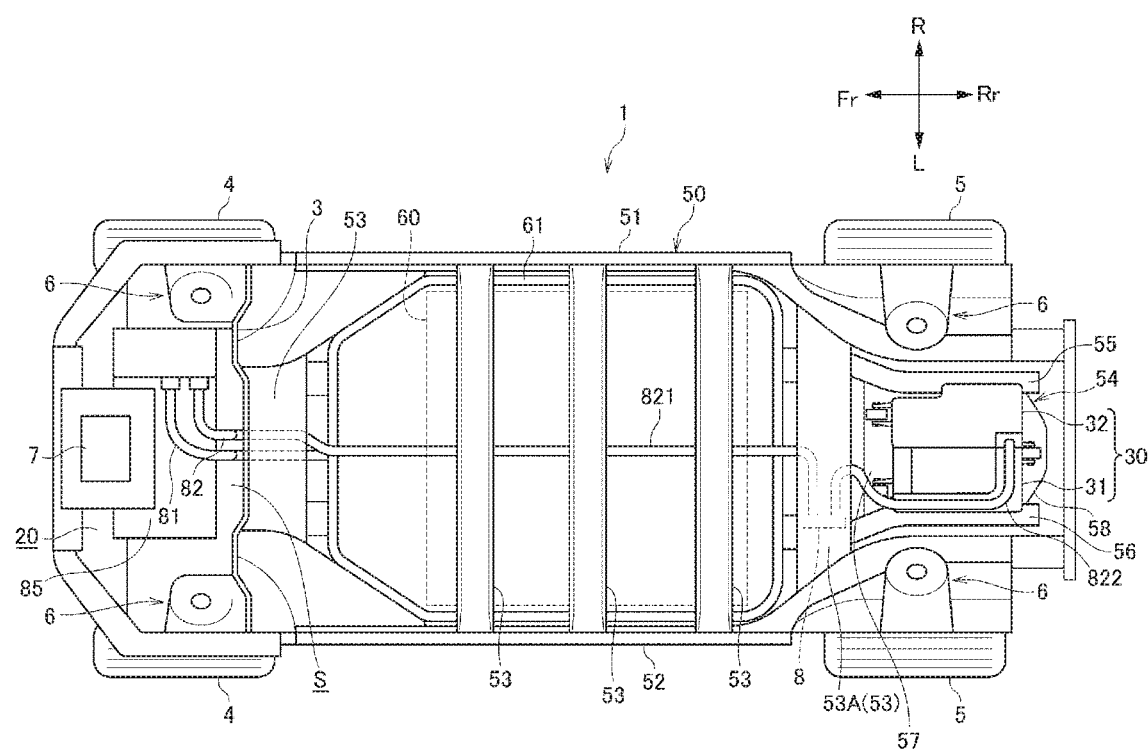
FIG. 2 is a plan view showing an underfloor structure of the vehicle in FIG. 1.

As shown in FIGS. 1 and 2, a vehicle 1 according to the embodiment of the present invention includes a vehicle interior 10 and a front room 20 in front of the vehicle interior 10, which are defined by a floor panel 2 and a dashboard 3. The vehicle interior 10 includes a front seat 11 and a rear seat 12. The floor panel 2 is provided with a drive device unit 30 therebelow in rear of the rear seat 12. The drive device unit 30 drives left and right rear wheels 5. That is, in the vehicle 1, the left and right rear wheels 5 are drive wheels, and left and right front wheels 4 are driven wheels. The front wheels 4 and the rear wheels 5 are separately supported on a vehicle body frame 50 via a suspension (not shown) supported by a suspension support portion 6.

The vehicle interior 10 is provided with a battery 60 therebelow that includes a plurality of battery modules 60a. The battery 60, which is accommodated in a battery case 61, is below the floor panel 2. A battery connector 62 is provided on a front surface of the battery case 61.

The vehicle body frame 50 includes a pair of left and right side members 51 and 52 extending in a front-rear direction, a plurality of cross members 53 extending in a left-right direction to connect the side members 51 and 52, and a sub-frame 54 having a rectangular shape to surround the drive device unit 30. The sub-frame 54 includes a pair of sub-side members 55 and 56 supported on the pair of side members 51 and 52, and a front frame member 57 and a rear frame member 58 that connect the pair of sub-side members 55 and 56. The drive device unit 30 includes a drive device 31 that accommodates a motor MOT serving as an electric motor, and a power supply control device (PCU) 32 serving as an electric motor control device that controls the motor MOT. The drive device 31 and the PCU 32 are electrically connected to each other via a bus bar (not shown).

[Configuration in Front Room]

Figure 3:
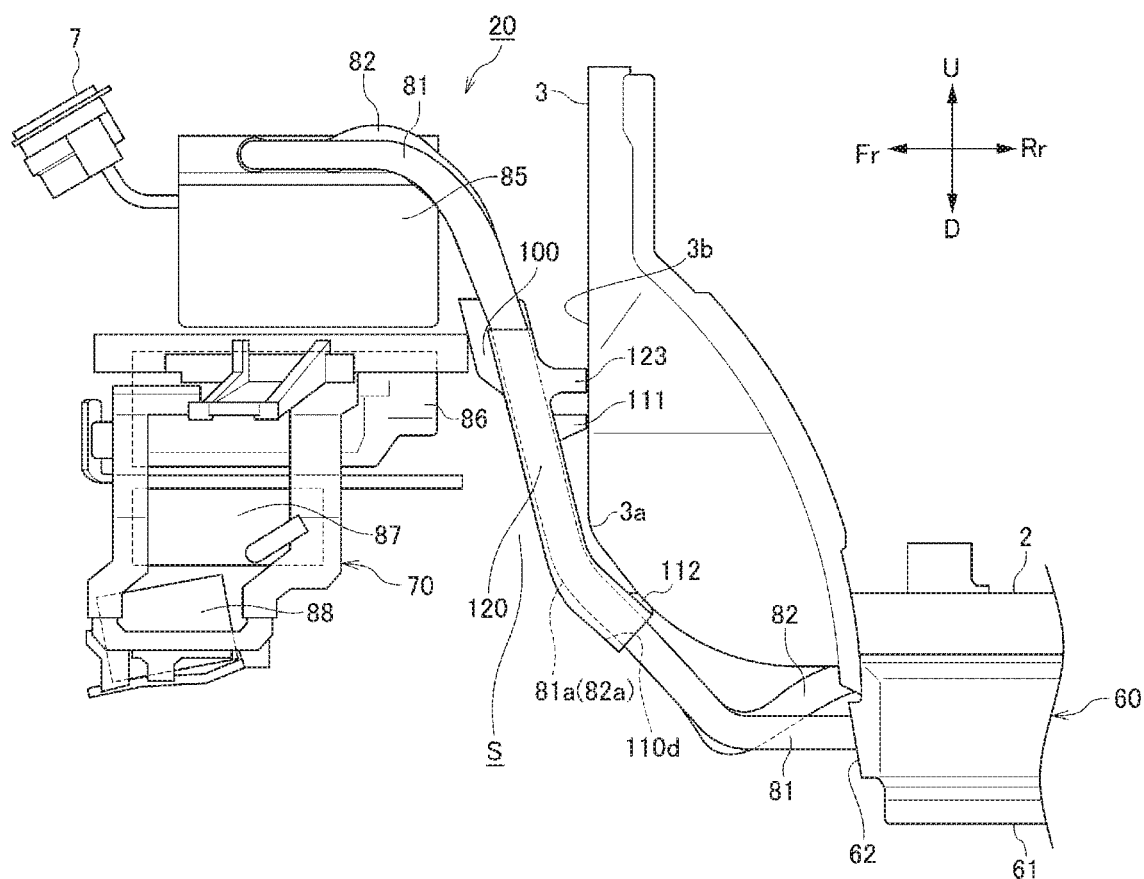
FIG. 3 is a side view of a front room of the vehicle in FIG. 1.

As shown in FIGS. 1 and 3, the front room 20 includes a junction box 85 that is connected to a charging port 7 provided at an upper portion of a front end of the vehicle 1. The junction box 85 is further connected to the drive device unit 30 via a PCU cable 82 which is a first protection target and is connected to the battery 60 via a battery cable 81 which is a second protection target.

More specifically, as shown in FIG. 2, the PCU cable 82 is a power transmission cable extending in the front-rear direction of the vehicle 1, which includes a first cable 821 extending from the junction box 85 and a second cable 822 extending from the PCU 32. The first cable 821 and the second cable 822 are connected to each other via a joint box 8, which is fixed to a lower surface of the cross member 53 (hereinafter, referred to as a support cross member 53A), located between the battery 60 and the drive device unit 30.

As shown in FIG. 3, auxiliaries including a charger 86, a DC-DC converter 87, and a battery heater 88 arranged in this order from an upper side to a lower side are held by an auxiliary frame 70 below the junction box 85. The battery cable 81 and the PCU cable 82 are disposed in a space S defined by the junction box 85, the auxiliary frame 70 and the dashboard 3 in the front room 20.

Figure 4:
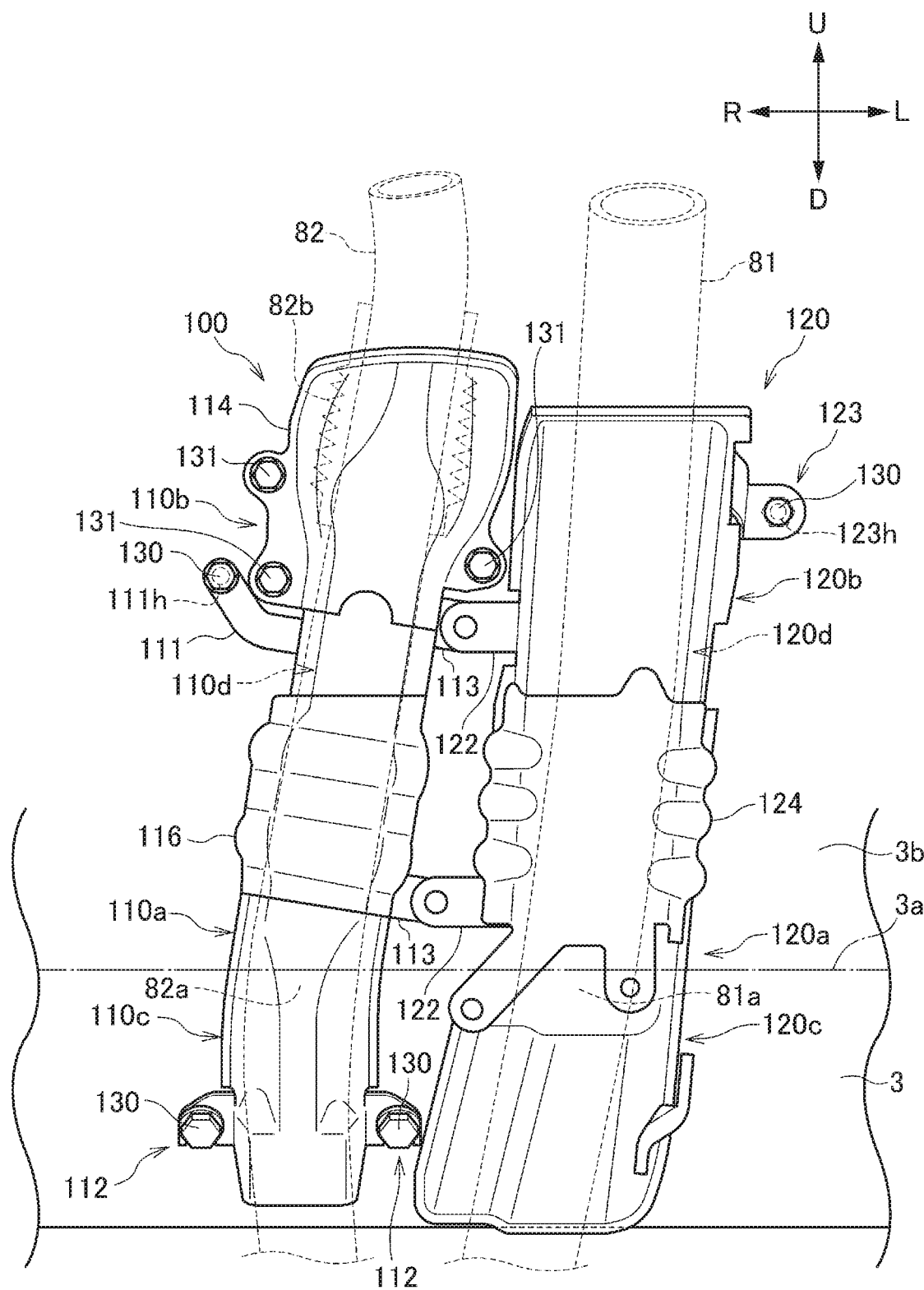
FIG. 4 is a front view of a first protector and a second protector of the vehicle in FIG. 1.

Referring also to FIG. 4, the PCU cable 82 and the battery cable 81 are arranged next to each other in the left-right direction along the dashboard 3, and extending in the upper-lower direction on a front surface of the dashboard 3. The PCU cable 82 and the battery cable 81 include curved portions 82a and 81a that are curved along a curved region 3a of the dashboard 3. The PCU cable 82 and the battery cable 81 are protected by a first protector 100 and a second protector 120, respectively. The first protector 100 and the second protector 120 are strong members that have a concave sectional shape and cover the PCU cable 82 and the battery cable 81 toward the dashboard 3.

[First Protector and Second Protector]

Next, the first protector 100 and the second protector 120 will be described with reference to FIGS. 4 to 7.

Figure 5:
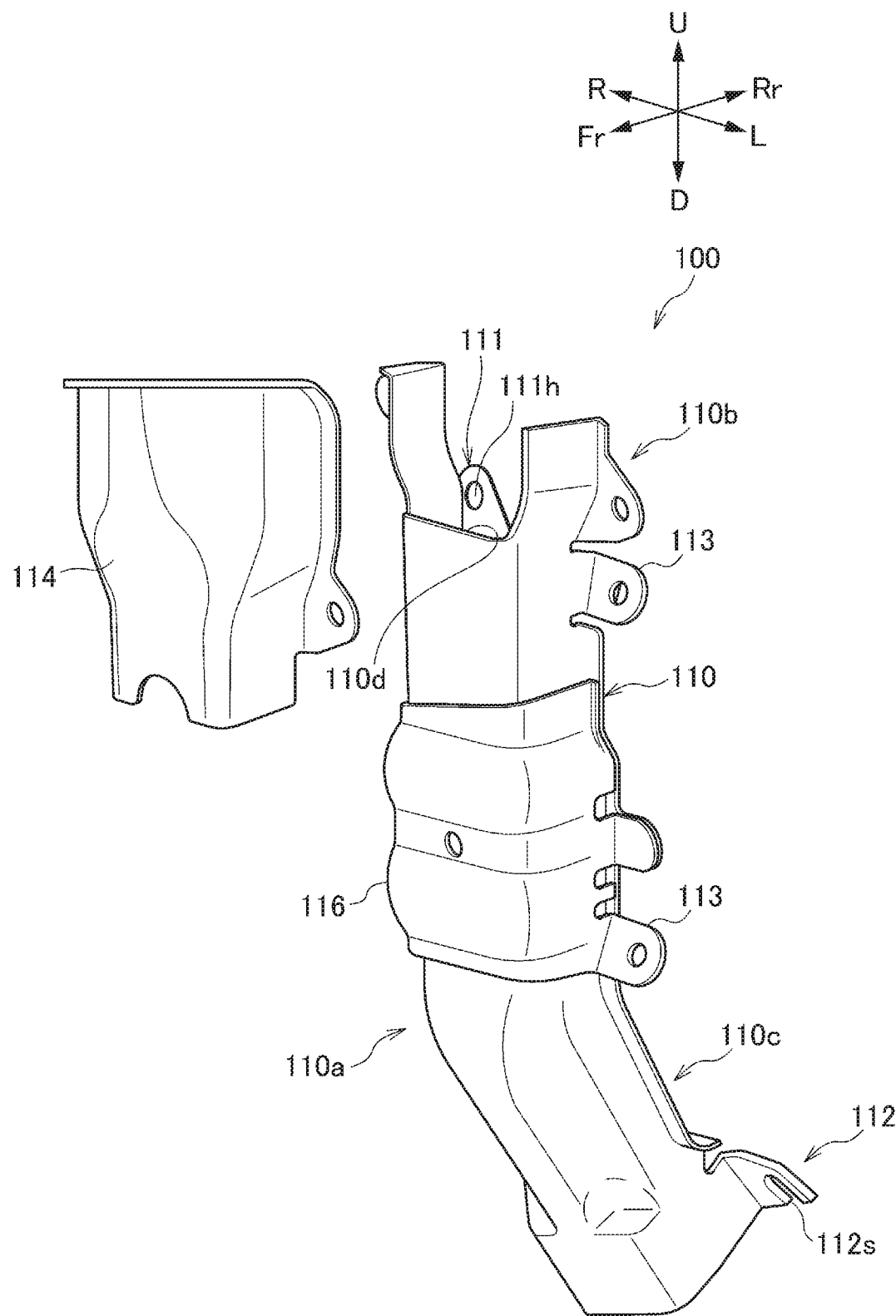
FIG. 5 is a perspective view of the first protector of the vehicle in FIG. 1.
Figure 6:
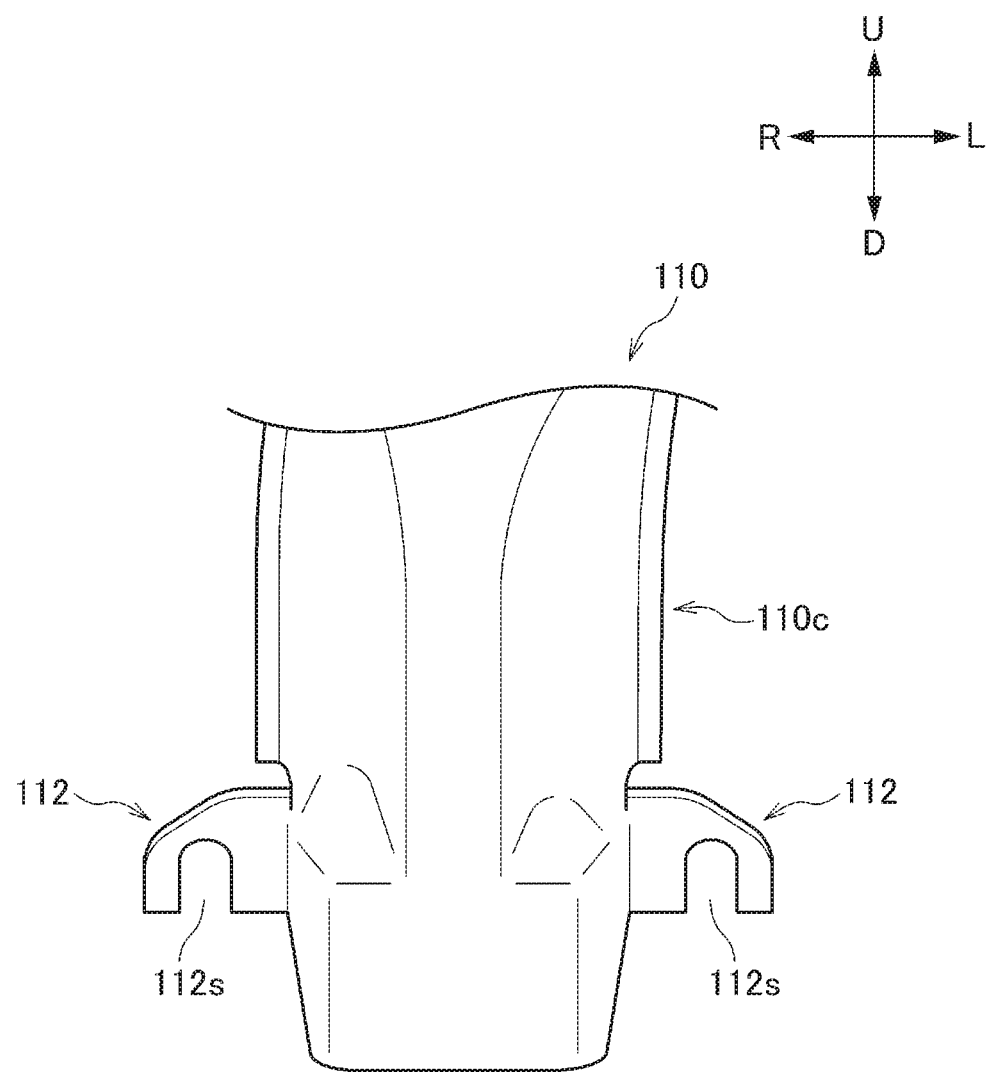
FIG. 6 is a front view showing a second fixing portion of the first protector of the vehicle in FIG. 1.

As shown in FIG. 5, the first protector 100 includes a protector main body 110 and a protector division portion 114 provided at an upper end portion of the protector main body 110 in a detachable manner. The protector main body 110 includes a bent portion 110a that covers the curved portion 82a of the PCU cable 82, an upper extension portion 110b extending upward from the bent portion 110a, and a lower extension portion 110c extending downward from the bent portion 110a. The upper extension portion 110b includes a first fixing portion 111 having a bolt insertion hole 111h. As shown in FIG. 6, the downward extension portion 110c includes a pair of second fixing portions 112 each having a slit 112s opened downward.

Figure 7:
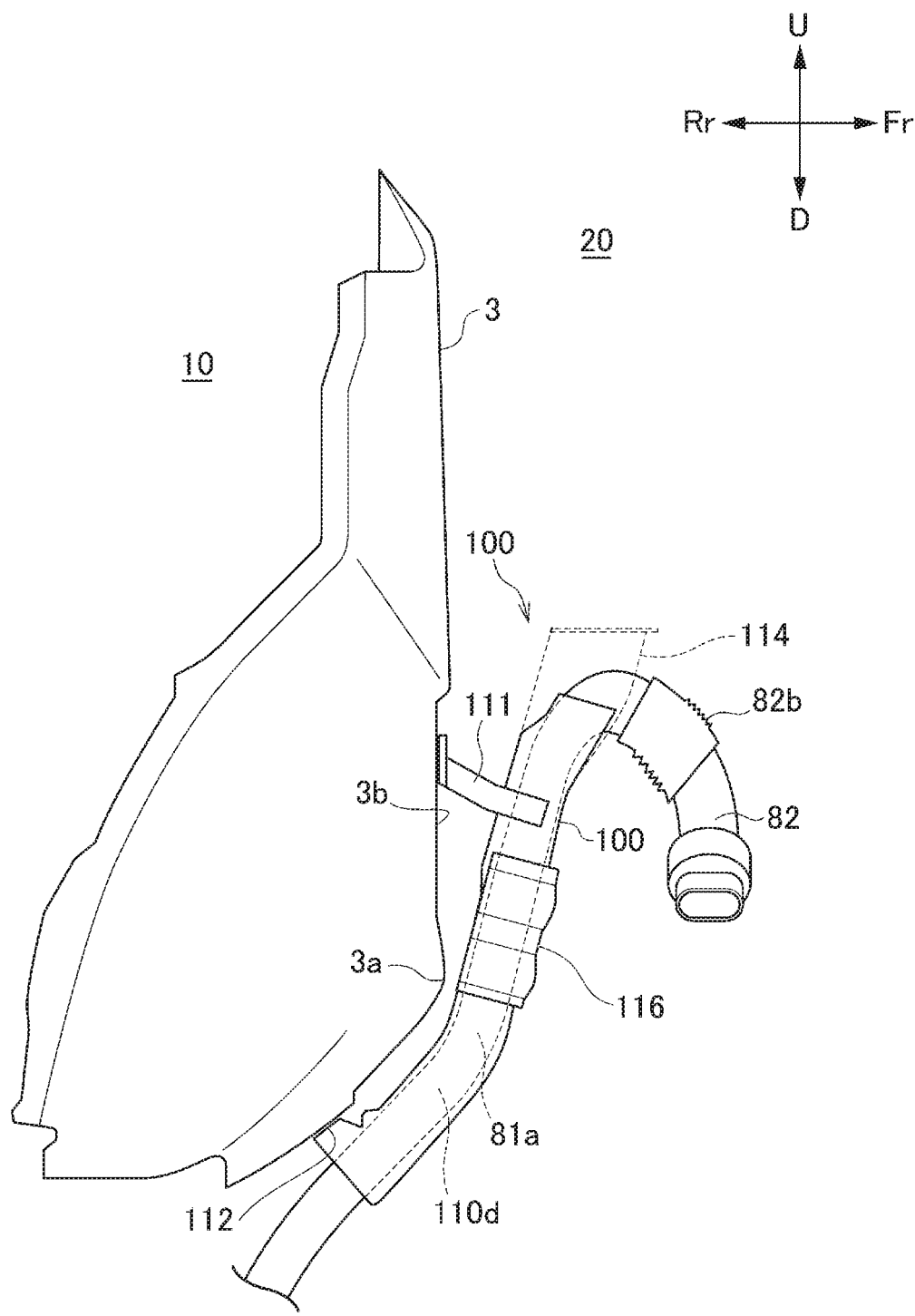
FIG. 7 is a side view of the first protector and a PCU cable when assembled to a dashboard.

The first fixing portion 111 is provided on a right surface of the upper extension portion 110b. As shown in FIGS. 3 and 7, the first fixing portion 111 extends toward the dashboard 3 further than a rear end portion of a first accommodating portion 110d that accommodates the PCU cable 82. The bolt insertion hole 111h is formed at a tip end portion of the first fixing portion 111. The pair of second fixing portions 112 are provided at a rear end portion of the first accommodating portion 110d.

As shown in FIG. 4, the first protector 100 includes a pair of upper and lower first connecting portions 113, which are connected to the second protector 120, on a left surface facing the second protector 120.

The second protector 120 includes a bent portion 120a that covers a curved portion 81a of the battery cable 81, an upper extension portion 120b extending upward from the bent portion 120a, and a lower extension portion 120c extending downward from the bent portion 120a. The upper extension portion 120b includes a pair of upper and lower second connecting portions 122, which are connected to the first protector 100, on a right surface near and facing the first protector 100. The second protector 120 includes a third fixing portion 123, which has a bolt insertion hole 123h, on a left surface away from the first protector 100. As shown in FIG. 3, the third fixing portion 123 extends toward the dashboard 3 further than a rear end portion of a second accommodating portion 120d that accommodates the battery cable 81.

Herein the strength of the first fixing portion 111 of the first protector 100 and the third fixing portion 123 of the second protector 120 is lower than the strength of the first accommodating portion 110d and the second accommodating portion 120d. That is, the first fixing portion 111 and the third fixing portion 123 constitute a fragile portion and positively deform during impact input, so as to absorb the impact.

The first connecting portions 113 of the first protector 100 and the second connecting portions 122 of the second protector 120 are connected by bolts and nuts (not shown) at positions away from the dashboard 3. The first connecting portion 113 and the second connecting portion 122 that are located above the bent portions 110a and 120a extend in a direction approaching each other from rear end portions near the dashboard 3 of the first accommodating portion 110d and the second accommodating portion 120d. In the first protector 100, the protector main body 110 and the protector division portion 114 are also connected by bolts 131 and nuts (not shown) at positions away from the dashboard 3.

As shown in FIG. 5, the upper end portion of the protector main body 110 of the first protector 100 has a concave shape as viewed from front. As described above, the protector division portion 114 is provided at the upper end portion of the protector main body 110 in a detachable manner. During vehicle manufacturing, as shown in FIG. 7, the PCU cable 82 can be hooked to the upper end portion of the protector main body 110 when the protector division portion 114 is removed.

As shown in FIGS. 4 and 7, the PCU cable 82 is provided with a detachment prevention portion 82b having a width larger than that of the first accommodation portion 110d of the first protector 100. The protector division portion 114 has a width larger than that of the detachment prevention portion 82b so that the detachment prevention portion 82b is covered by the protector division portion 114 which is attached to the upper end portion of the first protector 100.

The upper extension portion 110b of the first protector 100 is provided with a first reinforcing portion 116, and the upper extension portion 120b of the second protector 120 is provided with a second reinforcing portion 124. The first reinforcing portion 116 and the second reinforcing portion 124 are disposed between (i) the first connecting portion 113 and the second connecting portion 122 on an upper side and (ii) the first connecting portion 113 and the second connecting portion 122 on a lower side. The first reinforcing portion 116 and the second reinforcing portion 124 are provided at positions abutting against the auxiliary frame 70 when the auxiliary frame 70 is moved rearward.

Bolts 130 are inserted separately into the bolt insertion hole 111h, the slit 112s, and the bolt insertion hole 123h of the first fixing portion 111, the second fixing portions 112, and the third fixing portion 123 when the first connecting portions 113 and the second connecting portions 122 are connected to each other. The bolts 130 are inserted and fastened into bolt mounting holes (not shown) opened in the dashboard 3. Accordingly, the first protector 100 and the second protector 120 having the above configuration are assembled to the dashboard 3 so as to cover the PCU cable 82 and the battery cable 81 from front.

During assembly to the dashboard 3, the protector division portion 114 of the first protector 100 is removed so that the PCU cable 82 is allowed to fit in and hook on the concave portion of the upper end portion of the first protector 100. Accordingly, as shown in FIG. 7, the PCU cable 82 can be hung at a desired position. Therefore, work efficiency is improved. At this time, the detachment prevention portion 82b of the PCU cable 82 is allowed to be locked to a front surface of the upper end portion of the first protector 100, so that the PCU cable 82 can be prevented from getting into the first accommodation portion 110d, and the assembly work can be performed safely and efficiently.

Figure 8A:
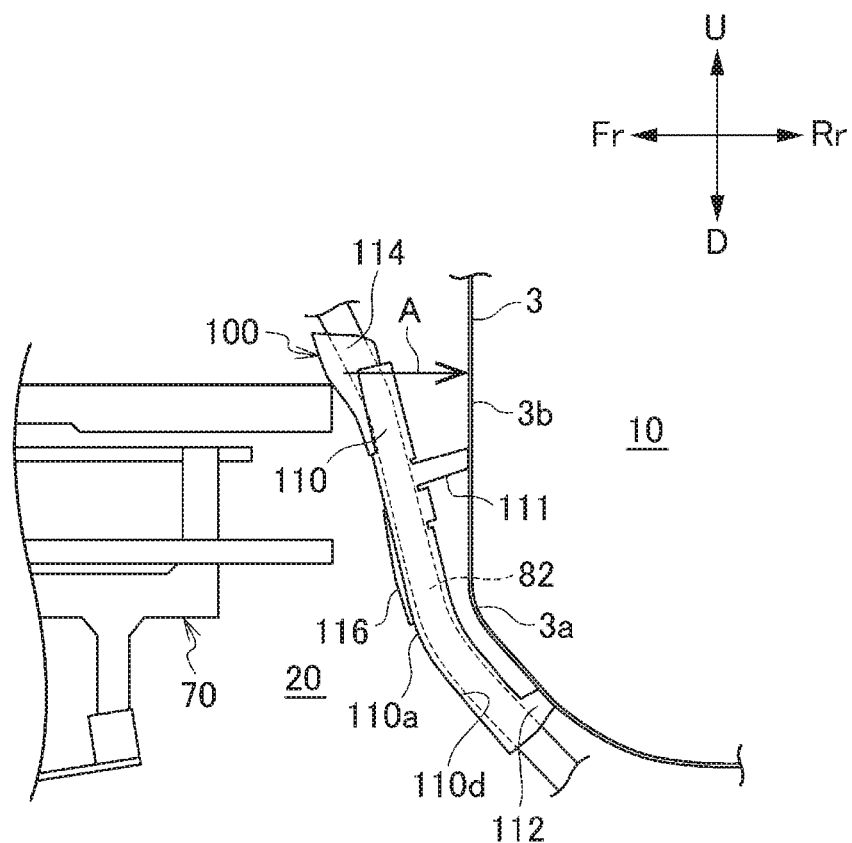
FIG. 8A is a side view showing the first protector and the second protector before a vehicle collision.
Figure 8B:
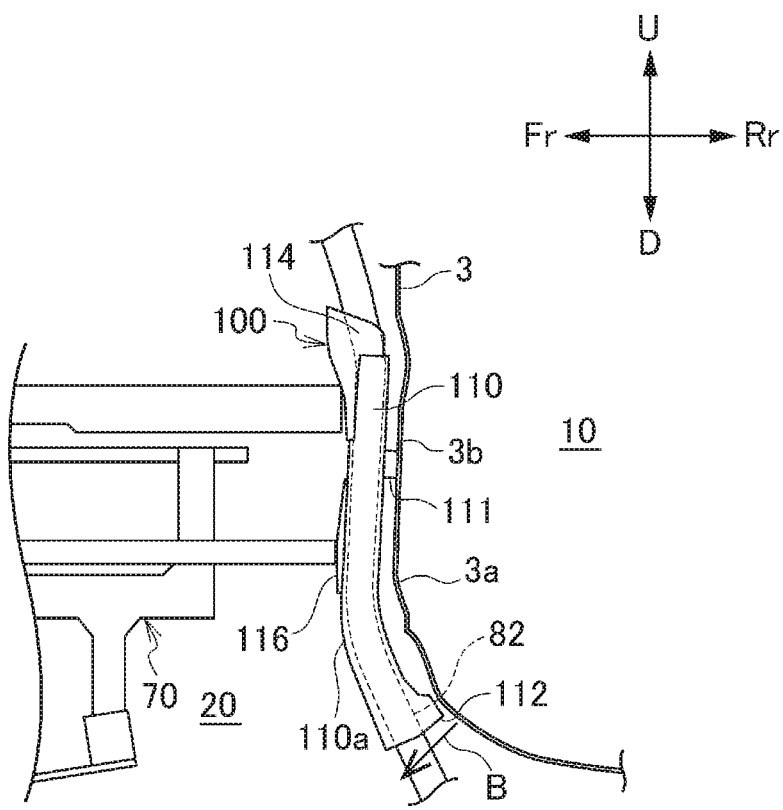
FIG. 8B is a side view showing the first protector and the second protector during the vehicle collision.
Figure 8C:
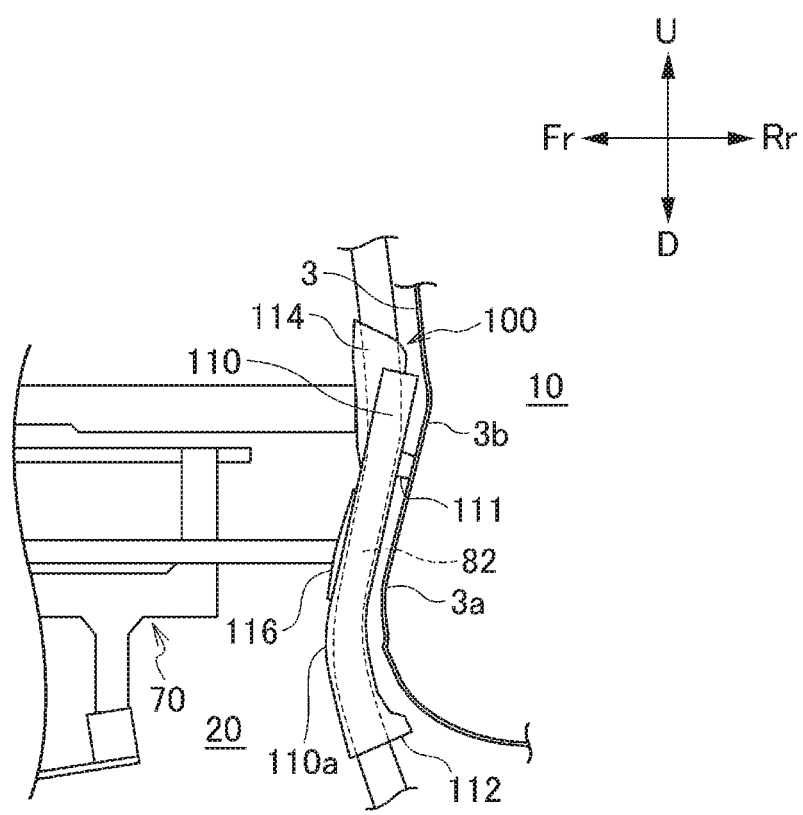
FIG. 8C is a side view showing the first protector and the second protector after the vehicle collision.

Next, protection of the PCU cable 82 by the first protector 100 during a vehicle collision will be described with reference to FIGS. 8A to 8C. FIGS. 8A to 8C only show the auxiliary frame 70. The charger 86, the DC-DC converter 87, and the battery heater 88 held by the auxiliary frame 70 are omitted.

As shown in FIG. 8A, before the vehicle collision, the first accommodation portion 110d of the first protector 100 and the dashboard 3 define a relatively large space in between since the first fixing portion 111 extends therein.

During the vehicle collision, the auxiliary frame 70 in the front room 20 moves toward the dashboard 3 and abuts against the first protector 100. More specifically, the auxiliary frame 70 abuts against the protector division portion 114 and the first reinforcing portion 116 of the first protector 100, and the first protector 100 is pressed toward the dashboard 3 (arrow A in FIG. 8A).

As a result, as shown in FIG. 8B, the first fixing portion 111 is crushed and deformed, and the impact load is absorbed by the deformation of the first fixing portion 111. At this time, the first protector 100 is restricted from being detached from the dashboard 3 by the bolt 130 of the first fixing portion 111, and is displaced or separated from the bolt 130 in the slit 112s of the second fixing portions 112 (arrow B in FIG. 8A). Accordingly, stress acting on the first protector 100 is relieved. Therefore, the first protector 100 can be restricted from detachment, and the first accommodation portion 110d of the first protector 100 can be prevented from breakage.

After the first fixing portion 111 is completely crushed, the impact load is applied to the dashboard 3 via the first accommodating portion 110d. The dashboard 3 is deformed by the impact load. At this time, a vertical region 3b located above the curved region 3a of the dashboard 3 is likely to be deformed. Accordingly, as shown in FIG. 8C, the upper extension portion 110b of the first protector 100 rotates toward the dashboard 3 with the bent portion 110a of the first protector 100 as a fulcrum. In this case, the concave sectional shape of the first accommodation portion 110d is maintained and the second fixing portion 112 is separated from the bolt 130. Accordingly, the lower extension portion 110c of the first protector 100 rotates away from the dashboard 3. As a result, the first accommodation portion 110d is prevented from deformation and the PCU cable 82 is properly protected.

Protection of the battery cable 81 by the second protector 120 is substantially the same as the protection of the PCU cable 82 by the first protector 100. The first protector 100 and the second protector 120 are subjected to an impact at the same time during the vehicle collision. Accordingly, the impact load is dispersed and the second accommodation portion 120d of the second protector 120 is also prevented from breakage.

Since the first protector 100 and the second protector 120 are connected by the first connecting portions 113 and the second connecting portions 122, relative displacement of the PCU cable 82 and the battery cable 81 can be restricted in addition to relative displacement of the first protector 100 and the second protector 120. Since the first connecting portion 113 and the second connecting portion 122 extend in a direction approaching each other from the rear end portions near the dashboard 3 of the first accommodating portion 110d and the second accommodating portion 120d, the first accommodating portion 110d and the second accommodating portion 120d can be prevented from deformation.

A point at which the auxiliary frame 70 collides during the vehicle collision is between the upper and lower first connecting portions 113 and the upper and lower second connecting portions 122 that connect the first protector 100 and the second protector 120, and the first reinforcing portion 116 and the second reinforcing portion 124 are provided therebetween. Therefore the first protector 100 and the second protector 120 can be reinforced, and the impact load can be dispersed in the first connecting portions 113 and the second connecting portions 122 on upper and lower sides.

The above embodiment can be appropriately modified, improved and the like. For example, the above embodiment describes a power transmission cable as a protection target that extends in an upper-lower direction along a dashboard. However, the present invention is not limited thereto, and other objects like pipes extending in the upper-lower direction along the dashboard can be protected by a protector having the same configuration as that of the above embodiment.

The present specification describes at least the following matters. Corresponding components in the above embodiment are shown in parentheses. However, the present invention is not limited thereto.

(1) A vehicle includes:
a vehicle interior (vehicle interior 10);
a front room (front room 20) provided in front of the vehicle interior with a dashboard (dashboard 3) interposed in between;
a first protection target (PCU cable 82) that is disposed along the dashboard and extends in an upper-lower direction; and
a first protector (first protector 100) that has a concave sectional shape and covers the first protection target toward the dashboard,
wherein the first protection target includes a curved portion (curved portion 82a) curved along a curvature of the dashboard, and wherein the first protector includes:
a bent portion (bent portion 110a) that covers the curved portion;
an upper extension portion (upper extension portion 110b) that extends upward from the bent portion; and
a lower extension portion (lower extension portion 110c) that extends downward from the bent portion,
wherein the upper extension portion includes a first fixing portion (first fixing portion 111) that has a bolt insertion hole (bolt insertion hole 111h) and is fixed to the dashboard, and
wherein the lower extension portion includes a second fixing portion (second fixing portion 112) that has a slit (slit 112s) opened downward and is fixed to the dashboard.

According to (1), the first protector is restricted from being detached from the dashboard by the first fixing portion during a vehicle collision, and is displaced or separated from the bolt in the slit of the second fixing portion. Accordingly, stress acting on the first protector is relieved. Accordingly, the first protector can be restricted from being detached from the dashboard and prevented from breakage. Therefore, the first protection target can be properly protected.

(2) The vehicle according to (1) further includes:
a second protection target (battery cable 81) that is disposed along the dashboard and extends in the upper-lower direction; and
a second protector (second protector 120) that has a concave sectional shape and covers the second protection target toward the dashboard,
wherein the first protector further includes:
a first connecting portion (first connecting portion 113) on a side surface (left surface) facing the second protector, the first connecting portion being connected to the second protector, and
wherein the second protector includes:
a second connecting portion (second connecting portion 122) on a side surface (right surface) near and facing the first protector, the second connecting portion being connected to the first protector; and
a third fixing portion (third fixing portion 123) on a side surface (left surface) away from the first protector, the third fixing portion having a bolt insertion hole (123h) and being fixed to the dashboard.

According to (2), the first protector and the second protector receive an impact during the vehicle collision, and the impact load can be dispersed accordingly. Since the first protector and the second protector are connected by the first connecting portions and the second connecting portions, relative displacement of protection targets can be restricted in addition to relative displacement of the first protector and the second protector.

(3) In the vehicle according to (2),
the first fixing portion extends toward the dashboard further than a first accommodating portion (first accommodating portion 110d) that accommodates the first protection target,
the third fixing portion extends toward the dashboard further than a second accommodating portion (second accommodating portion 120d) that accommodates the second protection target, and
strength of the first fixing portion and the third fixing portion is lower than strength of the first accommodating portion and the second accommodating portion.

According to (3), the first fixing portion and the third fixing portion are deformed during the vehicle collision, and the impact load can be absorbed accordingly.

(4) In the vehicle according to (3),
the first connecting portion and the second connecting portion extend in a direction approaching each other from dashboard-side end portions of the first accommodating portion and the second accommodating portion.

According to (4), the first accommodating portion and the second accommodating portion can be prevented from deformation, and relative displacement of the first protector and the second protector can be restricted.

(5) In the vehicle according to any one of (2) to (4),
the first fixing portion, the third fixing portion, the first connecting portion, and the second connecting portion are located above the bent portion, and
the second fixing portion is located below the bent portion.

According to (5), it is possible to suitably protect by moving portions of the first protector and the second protector that are above the bent portion are moved together with the dashboard and a portion below the bent portion is allowed to be displaced relative to the dashboard. Accordingly, the first protection target and the second protection target can be protected properly.

(6) In the vehicle according to any one of (2) to (5),
the first connecting portion and the second connecting portion are provided in pair and are separated from each other in the upper-lower direction,
the first protector includes a first reinforcing portion (first reinforcing portion 116),
the second protector includes a second reinforcing portion (second reinforcing portion 124), and
the first reinforcing portion and the second reinforcing portion are disposed between (i) the first connecting portion and the second connecting portion on an upper side and (ii) the first connecting portion and the second connecting portion on a lower side.

According to (6), a point at which a peripheral device collides during the vehicle collision is between connecting portions of the first protector and the second protector, and the first reinforcing portion and the second reinforcing portion are provided in between. Accordingly, the first protector and the second protector can be reinforced and the impact load can be dispersed to the upper and lower connecting portions.

(7) In the vehicle according to any one of (1) to (6),
the first protection target is a power transmission cable (PCU Cable 82) that extends in a front-rear direction of the vehicle, and
the first protector further includes a protector main body (protector main body 110) whose upper end portion has a concave shape as viewed from front.

According to (7), during vehicle manufacturing, the power transmission cable extending in the front-rear direction of the vehicle is hooked on the concave portion at the upper end portion of the protector main body. Accordingly, the power transmission cable can be hung at a desired position.

(8) In the vehicle according to (7),
the first protection target is provided with a detachment prevention portion (detachment prevention portion 82b) in vicinity of the upper end portion of the protector main body, the detachment prevention portion having a width larger than a width of the first accommodation portion that accommodates the first protection target.

According to (8), when the power transmission cable is hooked on the concave portion of the protector main body, the power transmission cable can be prevented from getting into the first protector.

(9) In the vehicle according to (8), the first protector further includes a protector division portion that has a width larger than a width of the detachment prevention portion and is attached to the upper end portion of the protector main body in a detachable manner.

According to (9), the power transmission cable can be protected and the flexibility of assembly can be improved.

The invention claimed is:

1. A vehicle comprising:
a vehicle interior;
a front room provided in front of the vehicle interior with a dashboard interposed therebetween;
a first protection target that is disposed along the dashboard and extends in an upper-lower direction; and
a first protector that has a concave sectional shape and covers the first protection target toward the dashboard,
wherein the first protection target includes a curved portion curved along a curvature of the dashboard, and
wherein the first protector includes:
   a bent portion that covers the curved portion:
   an upper extension portion that extends upward from the bent portion; and
   a lower extension portion that extends downward from the bent portion,
   wherein the upper extension portion includes a first fixing portion that has a bolt insertion hole and is fixed to the dashboard, and
   wherein the lower extension portion includes a second fixing portion that has a slit opened downward and is fixed to the dashboard.

2. The vehicle according to claim 1, further comprising:
a second protection target that is disposed along the dashboard and extends in the upper-lower direction; and
a second protector that has a concave sectional shape and covers the second protection target toward the dashboard,
wherein the first protector further includes:
   a first connecting portion on a side surface facing the second protector, the first connecting portion being connected to the second protector, and
wherein the second protector includes:
   a second connecting portion on a side surface near and facing the first protector, the second connecting portion being connected to the first protector; and
   a third fixing portion on a side surface away from the first protector, the third fixing portion having a bolt insertion hole and being fixed to the dashboard.

3. The vehicle according to claim 2,
wherein the first fixing portion extends toward the dashboard further than a first accommodating portion that accommodates the first protection target,
wherein the third fixing portion extends toward the dashboard further than a second accommodating portion that accommodates the second protection target, and
strength of the first fixing portion and the third fixing portion is lower than strength of the first accommodating portion and the second accommodating portion.

4. The vehicle according to claim 3,
wherein the first connecting portion and the second connecting portion extend in a direction approaching each other from dashboard-side end portions of the first accommodating portion and the second accommodating portion.

5. The vehicle according to claim 2,
wherein the first fixing portion, the third fixing portion, the first connecting portion, and the second connecting portion are located above the bent portion, and
wherein the second fixing portion is located below the bent portion.

6. The vehicle according to claim 2,
wherein the first connecting portion and the second connecting portion are provided in pair and are separated from each other in the upper-lower direction,
wherein the first protector includes a first reinforcing portion,
wherein the second protector includes a second reinforcing portion, and
wherein the first reinforcing portion and the second reinforcing portion are disposed between (i) the first connecting portion and the second connecting portion on an upper side and (ii) the first connecting portion and the second connecting portion on a lower side.

7. The vehicle according to claim 1,
wherein the first protection target is a power transmission cable that extends in a front-rear direction of the vehicle, and
wherein the first protector further includes a protector main body whose upper end portion has a concave shape as viewed from front.

8. The vehicle according to claim 7,
wherein the first protection target is provided with a detachment prevention portion in vicinity of the upper end portion of the protector main body, the detachment prevention portion having a width larger than a width of the first accommodation portion that accommodates the first protection target.

9. The vehicle according to claim 8,
wherein the first protector includes a protector division portion that has a width larger than a width of the detachment prevention portion and is attached to the upper end portion of the protector main body in a detachable manner.

* * * * *